No. 893,502. PATENTED JULY 14, 1908.
R. HUFF.
MOTOR VEHICLE.
APPLICATION FILED DEC. 18, 1907.
2 SHEETS—SHEET 1.
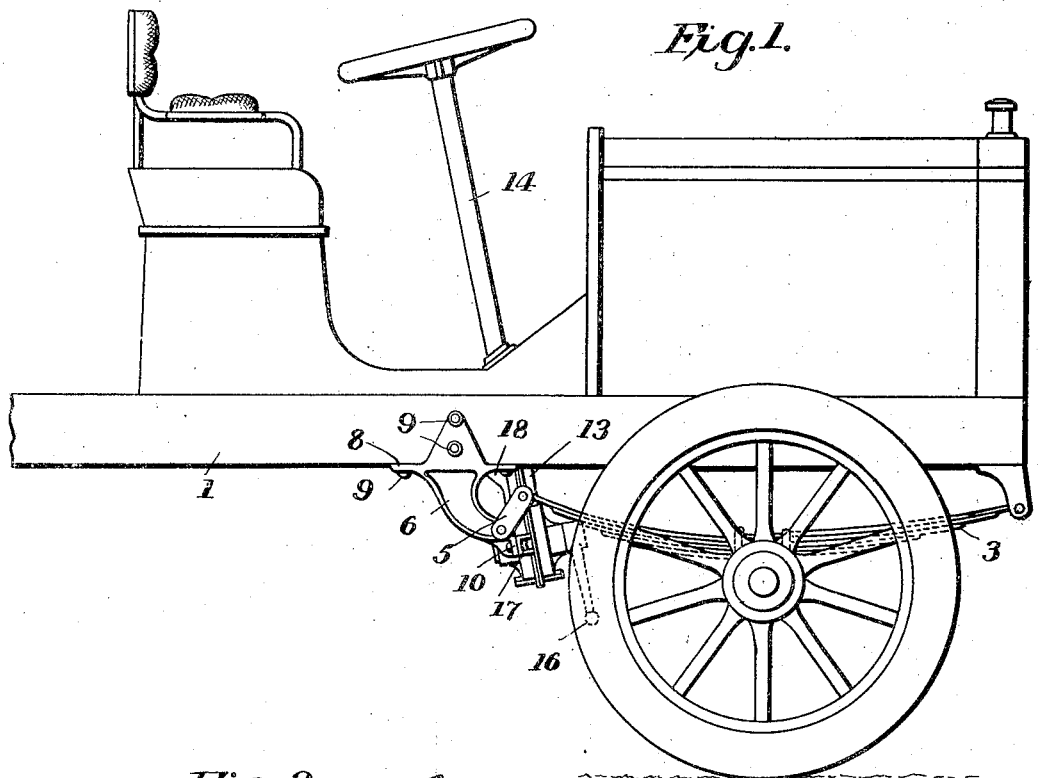
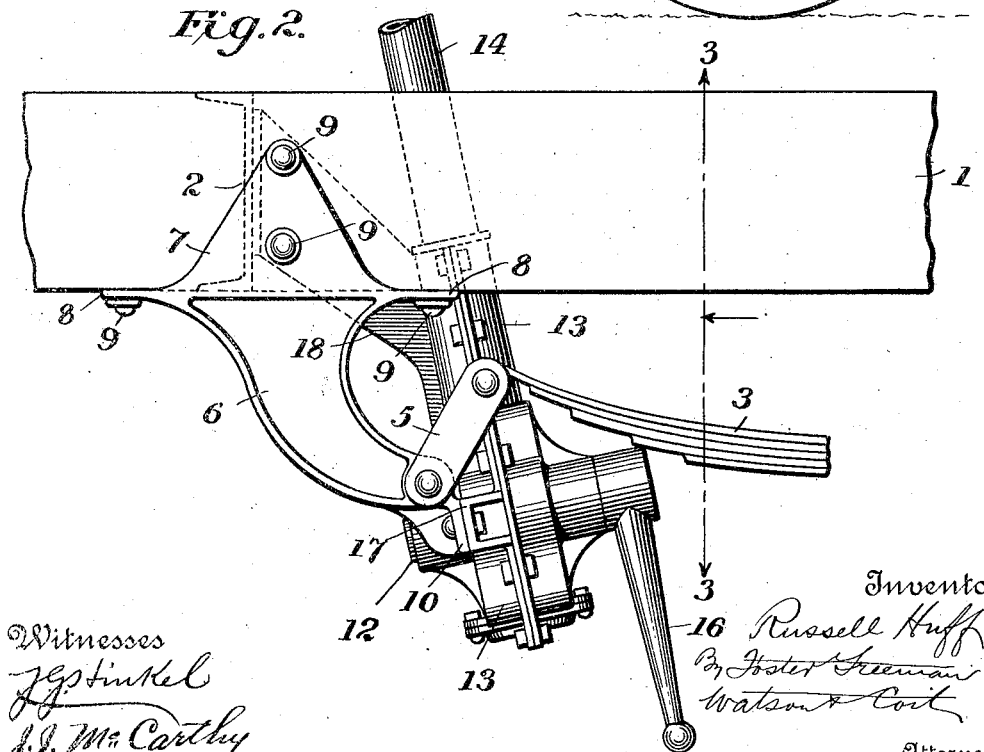

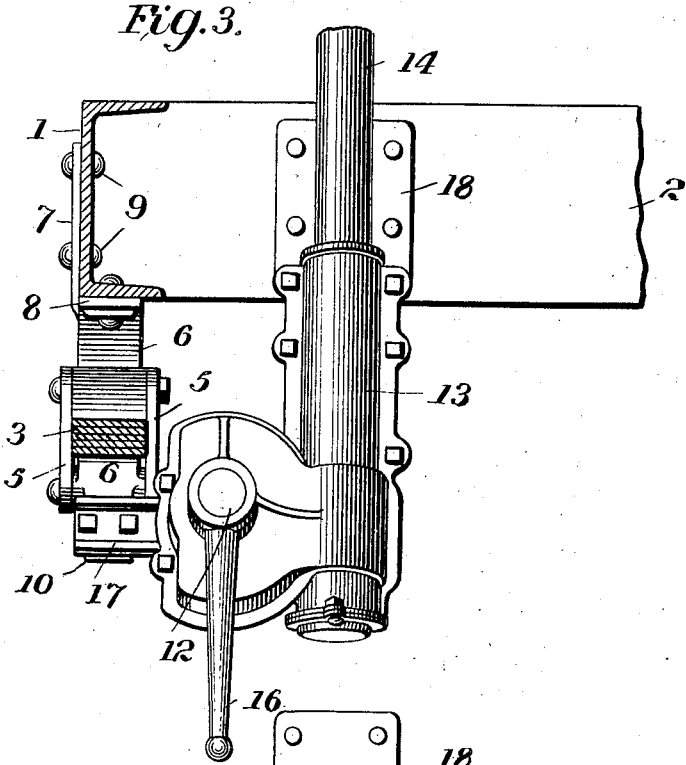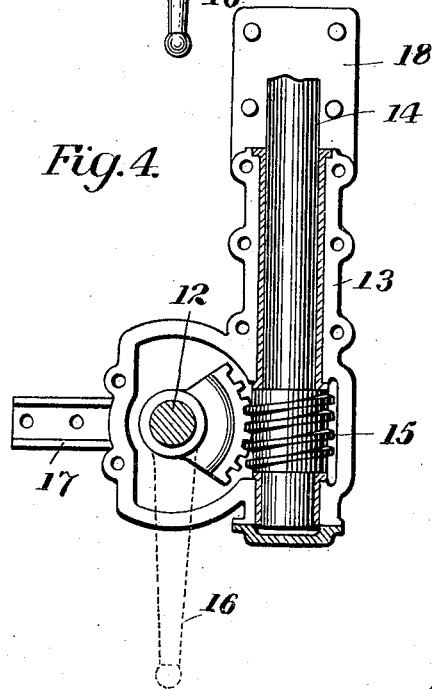

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF WEST VIRGINIA.

MOTOR-VEHICLE.

No. 893,502.   Specification of Letters Patent.   Patented July 14, 1908.

Application filed December 18, 1907. Serial No. 407,054.

*To all whom it may concern:*

Be it known that I, RUSSELL HUFF, a citizen of the United States, and resident of Detroit, Wayne county, State of Michigan, have invented certain new and useful Improvements in Motor-Vehicles, of which the following is a specification.

The present invention relates to improvements in motor vehicles and particularly to the manner of mounting or supporting the steering gear casing.

The object of the invention is to provide means by which the steering gear casing may be hung at a greater distance below the body of the vehicle frame than has been heretofore practicable, while maintaining a rigid strong connection between the casing and frame.

In the accompanying drawings, Figure 1 is a side elevation of a portion of a motor vehicle frame and steering gear casing supported therefrom in accordance with the present invention; Fig. 2 is a similar view of the gear casing and its supporting devices on an enlarged scale; Fig. 3 is a front elevation viewed from the line 3—3 of Fig. 2; Fig. 4 is a face view of a portion of the steering gear, one section of the casing being removed.

Referring to the drawings, 1 designates one of the side bars of a motor vehicle frame, 2 a transverse or cross bar of such frame and 3 one of the forward supporting springs for the vehicle frame. The rear end of the spring is connected with a shackle 5, the lower end of which is pivotally connected with a bracket 6 depending from and rigidly secured to the side bar 1 of the frame. As shown, the bracket is provided with flanges 7, 8, which extend respectively along the side and lower faces of the bar 1 and are rigidly secured to said bar by bolts or rivets 9.

The bracket 6 is continued below and forward from its point of connection with the spring shackle 5 and terminates in a transversely extending plate or ear 10 which is shown as slightly inclined.

The steering gear casing, as shown, is made in two sections 13 detachably connected by suitable bolts; and is of such form as to provide bearings for a steering column 14, having thereon a worm 15, and for a substantially horizontal shaft 12, with which is connected a segment gear that meshes with the worm. An arm 16 at one end of the shaft 12 is adapted to actuate the devices for turning the forward wheels to control the direction of movement of the vehicle.

At one side the steering gear casing is provided with a laterally projecting ear or arm 17 which is secured firmly against the forward end 10 of the depending spring bracket 6; and near its opposite side the casing is provided with a rearwardly and upwardly extending arm 18 that has its upper end secured directly against the transverse frame bar 2.

Preferably the supporting bars 17, 18, of the gear casing are formed integral with one section thereof and it will be noticed that they are arranged on opposite sides of the bearings for the shaft 12 thus providing a very strong and rigid support for the steering devices.

The invention also makes it possible to utilize the depending spring bracket not only for furnishing a connection between the spring and the frame but also for assisting to support the gear casing.

Having described my invention what I claim and desire to secure by Letters-Patent is, 1. In a motor vehicle, the combination with the frame, the steering column, the forward spring, and the bracket depending from the frame and connected with the spring, of a steering gear casing having two arms, one of which is attached directly to the frame and the other to the said bracket.

2. In a motor vehicle, the combination with the frame, the steering column, the forward spring, and the bracket depending from the frame and connected with the spring, of a two-part steering gear casing, one of said parts having arms connected respectively to the frame and the depending bracket and the other part being connected to the first named part.

3. In a motor vehicle, the combination with the frame, the steering column, the forward spring, and the bracket depending from the frame and connected with the spring, said bracket having an extension below the point of connection of the spring, of a steering gear casing having a lateral arm connected to said extension, and an upwardly extending arm connected to the frame.

4. In a motor vehicle, the combination with the frame having longitudinal and transverse members, the steering column, the depending bracket connected with a longitudinal member of the frame and the forward spring connected with said bracket, of a steering gear casing having a lateral arm connected with the said bracket and a second arm connected with a transverse member of the frame, for the purpose set forth.

5. In a motor vehicle, the combination with the frame, the steering column, the forward spring, and the bracket depending from the frame and connected with the spring, of a steering gear casing, a steering shaft 12 mounted in bearings in said casing, and arms on said casing on opposite sides of said shaft, said arms being respectively connected to the depending bracket and the frame, for the purpose set forth.

6. In a motor vehicle, the combination with the frame, the steering column, the forward spring, and the bracket depending from the frame and connected with the spring, of a steering gear casing and means for supporting the same including a connection from the casing to said bracket.

7. In a motor vehicle, the combination with the frame, the steering column, the forward spring, and the bracket depending from the frame and connected with the spring, of a steering gear casing attached to the frame and having an arm connected with said bracket.

In testimony whereof I affix my signature in presence of two witnesses.

RUSSELL HUFF.

Witnesses:
MILTON TIBBETTS,
JNO. D. CURRY.